United States Patent [19]

Obata et al.

[11] Patent Number: 4,812,203

[45] Date of Patent: Mar. 14, 1989

[54] EVAPORATOR

[75] Inventors: Kenji Obata, Musashino; Nobuhiko Yoneda, Omuta; Masabumi Kataita, Omuta; Yoshihiro I, Omuta; Hironori Yamashita, Omuta, all of Japan

[73] Assignee: Mitsui Toatsu Chemicals, Incorporated, Tokyo, Japan

[21] Appl. No.: 65,625

[22] Filed: Jun. 23, 1987

Related U.S. Application Data

[63] Continuation of Ser. No. 767,999, Aug. 21, 1985, abandoned.

[30] Foreign Application Priority Data

Aug. 31, 1984 [JP] Japan ................................ 59-180325

[51] Int. Cl.$^4$ ............................................. B01D 1/22
[52] U.S. Cl. ...................................... 159/6.2; 159/13.4; 159/25.2; 159/49; 202/175; 202/236; 202/265; 203/89; 165/115; 165/145; 165/169
[58] Field of Search ................ 159/6.2, 51, 13.4, 25.2, 159/49, 13.1, 6.1–6.3; 165/145, 169, 94, 115; 202/175, 236, 261, 262, 265; 203/89

[56] References Cited

U.S. PATENT DOCUMENTS

| | | |
|---|---|---|
| 3,354,136 | 11/1967 | Crawford ............................ 165/94 |
| 3,412,776 | 11/1968 | Donovan ............................ 159/6.3 |

FOREIGN PATENT DOCUMENTS

| | | | |
|---|---|---|---|
| 0133020 | 11/1978 | Fed. Rep. of Germany ....... | 159/6.2 |
| 2926855 | 1/1980 | Fed. Rep. of Germany ....... | 159/6.2 |
| 3229030 | 2/1984 | Fed. Rep. of Germany ...... | 202/175 |
| 7331470 | 5/1970 | Japan .................................. | 159/6.2 |
| 7903159 | 10/1980 | Netherlands ......................... | 165/94 |
| 0230779 | 4/1969 | U.S.S.R. ............................... | 159/6.2 |
| 1260428 | 1/1972 | United Kingdom ................. | 159/6.2 |

OTHER PUBLICATIONS

Hitachi, Ltd., MK-090P brochure on agitated thin-film evaporators.

*Primary Examiner*—David L. Lacey
*Assistant Examiner*—V. Manoharan
*Attorney, Agent, or Firm*—Flynn, Thiel, Boutell & Tanis

[57] ABSTRACT

An evaporator which is formed, in combination, of a first evaporator of a centrifugal falling-film type; and a second evaporator having a shape formed of a heating side wall portion of a downward-pointing conical configuration, a cover portion defining at least one opening, through which a liquid to be treated is charged and resulting volatile components are discharged, and a bottom portion defining at least one opening permitting discharge of an evaporation residue. A scraping agitator is built in the second evaporator. The side wall portion is externally wrapped with a pipe or the like, whereby a heating medium is caused to pass therethrough for heating the side wall portion. The evaporation residue discharge opening of the first evaporator is connected to the opening of the cover portion of the second evaporator.

The above evaporator is suitable to recover a volatile component from a high-viscosity liquid containing tar-like substances. It can achieve a high recovery rate. The evaporation residue is discharged in the form of a powderized solid, thereby facilitating its post treatments.

4 Claims, 3 Drawing Sheets

EVAPORATOR

This application is a continuation of application Ser. No. 767,999, filed on Aug. 21, 1985, and now abandoned.

TECHNICAL FIELD

This invention relates to an evaporator which can recover, with a high recovery rate, a volatile component from a high-viscosity liquid containing tar-like substances.

BACKGROUND OF THE INVENTION

As evaporators for the recovery of volatile components from liquids of high viscosities, there have conventionally been used evaporators with a number of heating tubes built therein, jacket-type batch evaporators and centrifugal falling-film evaporators.

Among such conventional evaporators, the centrifugal falling-film evaporators are believed to be most suitable for the recovery of volatile components from high-viscosity liquids as far as the present inventors are aware of, because they have inter alia such merits that (a) they can achieve high heat efficiencies upon evaporation of volatile components and (b) they require shorter retention time periods for liquids to be treated therein, whereby they are appropriate as apparatus for the recovery of volatile components susceptible to thermal decomposition; (c) they have structures suited for operation under reduced pressures, thereby permitting low-temperature evaporation of volatile components having high boiling points or which are liable to thermal decomposition; and (d) their heating surfaces have structures resistant to scale deposition and they hence permit long-term continuous operation without development of any substantial reduction of their efficiencies of heat conduction during their operation.

When the recovery of a volatile component from a liquid having a high viscosity is attempted by means of a centrifugal falling-film evaporator, an evaporation residue is generally formed as a tar-like matter which still contains the target component of the recovery, namely, the volatile component at a significant concentration. It is thus not preferred from the economical viewpoint to discard the evaporation residue as is. Due to the tar-like nature of the evaporation residue, its disposal is cumbersome and time-consuming and moreover, requires a variety of difficult precautions to prevent environmental contamination.

In order to achieve further recovery of the volatile component from the tar-like evaporation residue, it may be contemplated to treat it in an evaporator of a different type, generally, in a batch evaporator. As a matter of fact, such an attempt was also made by the present inventors. It was impossible to improve the recovery rate of the remaining volatile component to any significant extent even when the tar-like evaporation residue was charged in conventionally-known evaporators of various types. Hence, the evaporation residue still remained in a tar-like form even after treated treatment in such additional evaporators. The above-mentioned various problems remained unsolved.

The present inventors strived to find solutions to the above-mentioned problems, resulting in the development of evaporators according to this invention.

DISCLOSURE OF THE INVENTION

The first object of this invention is to provide an evaporator which can recover, with a high recovery rate, a volatile component from a high-viscosity liquid containing tar-like substances.

The second object of this invention is to provide an evaporator which can provide evaporation residue not in a tar-like form but in a powderized solid form.

The above objects of this invention can be attained by the provision of an evaporator which comprises:

a first evaporator of the known-structured centrifugal falling-film type, said first evaporator defining an evaporation residue discharge opening; and a second evaporator having a shape formed of a heating side wall portion of a downward-pointing conical configuration, a cover portion defining at least one opening through which a liquid to be treated is charged and the resulting volatile component is discharged, and a bottom portion defining at least one opening permitting discharge of an evaporation residue, being equipped with a scraping agitator built in the second evaporator and supported on a rotary shaft driven by a drive apparatus, the scraper of said agitator being arranged so as to scrape a deposit off from at least the heating side wall portion, and said heating side wall portion being equipped externally with heating means;

the evaporation residue discharge opening of the first evaporator being connected to the opening of the cover portion of the second evaporator under such a relative positional relation that the evaporation residue of the first evaporator is allowed to flow down into the second evaporator by its own gravity.

Owing to the above-described connection and arrangement of the two evaporators of different structures, the above-mentioned two objects of this invention have surprisingly been fulfilled simultaneously. The objects of this invention cannot be achieved if the first and second evaporators should be arranged separately and they should be operated in such a way that each evaporation residue of the first evaporator is once taken out of the evaporator and is then fed batchwise to the second evaporator. In the latter case, similar to the prior art techniques, the recovery rate of the target volatile component is not improved significantly and the evaporation residue of the second evaporator still remains as a tar-like matter.

BEST MODES FOR CARRYING OUT THE INVENTION

In the present invention, the first evaporator is a centrifugal falling-film evaporator of known structure. It comprises a housing and is equipped with a plurality of rotary vanes which are built in the first evaporator and mounted on a rotary shaft which is coaxially disposed in said housing and driven by a drive apparatus.

When a liquid is charged in the first evaporator, it is vigorously stirred by the rotary vanes and spread out against the cylindrical inner wall of first evaporator by virtue of centrifugal forces applied thereto owing to the rotation of the vanes. At the same time, the thus-charged liquid is heated by heating means provided on the outer wall of the cylindrical portion so that the volatile component or components present in the liquid are caused to evaporate. Of such centrifugal falling-film evaporators, those having upright structures are preferred.

Figure 2:
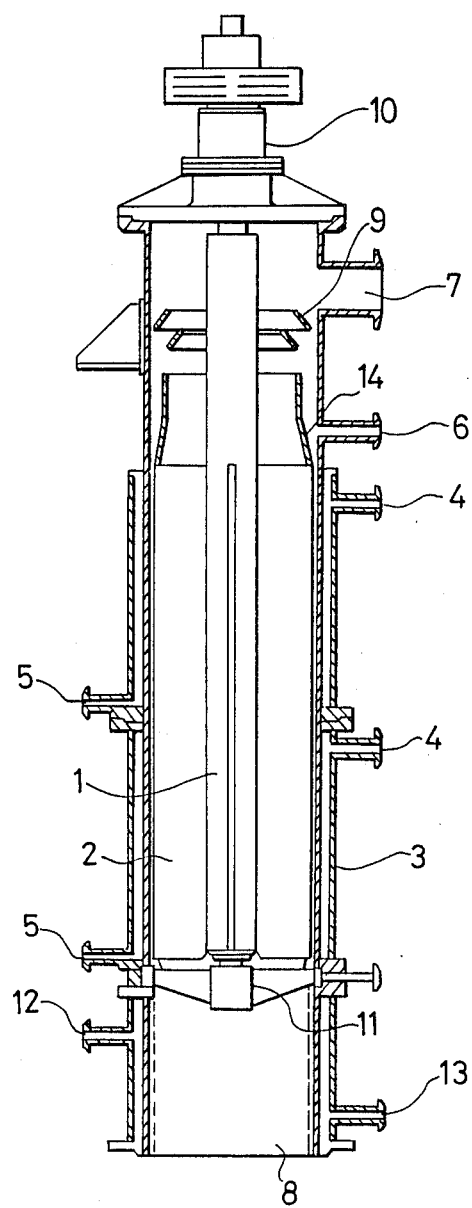
FIG. 2 is a simplified vertical cross-sectional view of the first evaporator, which has an upright structure by way of example.

FIG. 2 illustrates the structure of an exemplary upright centrifugal falling-film evaporator.

In FIG. 2, the evaporator is internally provided with rotary vanes 2 supported on journal boxes 10,11 by way of a rotary shaft 1 driven by a drive apparatus (not shown). Outside the evaporator, a jacket 3 is provided so that the interior of the evaporator can be heated by causing a heating medium, for example, steam to flow from an inlet 4 to an outlet 5. In an upper part of the first evaporator, an opening 6 adapted to charge each liquid to be treated is provided. The liquid, which has been charged through the opening 6, is distributed by a baffle 14 toward the inner side wall of the evaporator and is then allowed to flow down on the rotary vanes. By virtue of centrifugal forces applied to the liquid by the rotary vanes driven by the unillustrated drive apparatus, the liquid is spread against the inner wall of the cylindrical portion so that it is heated by the heating medium flowing through the jacket. The volatile component, which has been caused to evaporate because of the heating, is allowed to ascend through the spacings between the rotary vanes 2. After separating any accompanying mist at a mist separator 9, the volatile component is taken out of the evaporator through a vapor outlet 7. On the other hand, the liquid which is under treatment flows downwardly while being concentrated and thus is rendered viscous little by little. Finally, it is taken out of the evaporator through an evaporation residue discharge opening 8. Incidentally, numerals 12 and 13 indicate respectively an inlet and outlet for a heating medium which is adapted to keep the evaporation residue warm or hot while it flows downwardly from the lower journal box 11 to the discharge opening 8.

FIG. 2 illustrates, as described above, one example of the first evaporator in the present invention. Needless to say, it should be borne in mind that the first evaporator in the evaporator according to this invention is not limited to or by the exemplary evaporator shown in FIG. 2. The first evaporator may take any structure so long as it is a centrifugal falling-film evaporator of a known structure. A horizontal falling-film evaporator may also be employed.

As specific examples of centrifugal falling-film evaporators of known structures, may be mentioned "Upright Hitachi KONTRO Processor", "Hitachi SEVCON Processor", "Hitachi Model-VL Thin-Film Processor" and "Horizontal Hitachi KONTRO Processor", all trade names and manufactured by Hitachi, Ltd., Tokyo, Japan.

As described above, the second evaporator in the present invention has a shape formed of a heating side wall portion of a downward-pointing conical configuration, a cover portion defining at least one opening, through which a liquid to be treated is charged and the resulting volatile component is discharged, and a bottom portion defining at least one opening permitting discharge of an evaporation residue, and being equipped with a scraping agitator built in the second evaporator and supported on a rotary shaft driven by a drive apparatus. The scraper of the agitator is arranged so as to scrape a deposit off from at least the heating side wall portion. The heating side wall portion is equipped externally with heating means.

Figure 3:
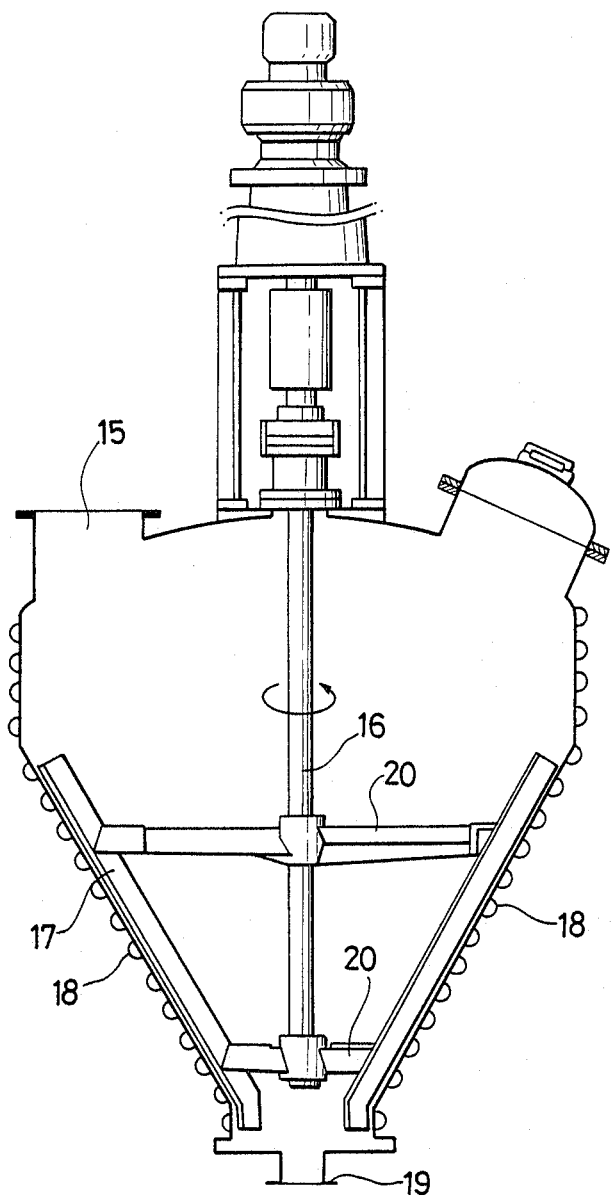
FIG. 3 is a simplified vertical cross-sectional view illustrating one example of the structure of the second evaporator.

FIG. 3 is a vertical cross-sectional view depicting one example of the structure of the second evaporator. The second evaporator in this invention will next be described with reference to FIG. 3.

The side wall portion serves as heating means. In the embodiment illustrated in FIG. 3, the side wall portion is composed of three sections, namely, an upper large-diameter cylindrical wall section, an intermediate downward-pointing conical wall section and a lower small-diameter cylindrical wall section. Of these sections, it is only the downward-pointing conical wall section that is essential to the structure of the second evaporator. The upper large-diameter cylindrical wall section and/or the lower small-diametered cylindrical wall section are optional. Of these optional sections, it is preferred from the structural standpoint to provide the lower small-diameter cylindrical wall section for the formation of the evaporation residue discharge opening 19. The lower small-diameter cylindrical wall section may also be used to effect the final and finishing evaporation in the evaporator of this invention by providing heating means, which will be described herein, at locations not impairing separation of a flange of the lower small-diametered cylindrical wall section from an associated flange of the intermediate downward-pointing conical wall section.

In the downward-pointing conical wall section, the wall inclination, namely, the angle of the generating line relative to the vertical line may be set at a desired value so long as its content, i.e., a viscous liquid or powder is allowed to fall downwardly. The angle may preferably range from 25° to 35°. The inner diameter of the lower extremity of the downward-pointing conical wall section may also be chosen as desired. It is however preferred to set the inner diameter within the range of from 30 cm to 60 cm. When the small-diameter cylindrical wall section is provided downwardly in continuation with the downward-pointing conical wall section, it is therefore preferred to set the inner diameter of the small-diameter cylindrical wall section within the same range. The height of the small-diameter cylindrical wall section may preferably be at least 10 cm. The inner diameter of the upper extremity of the downward-pointing conical wall section, in other words, the inner diameter and height of the upper large-diameter cylindrical wall section are principal factors governing the capacity of the second evaporator when the large-diameter cylindrical wall section is provided. This matter will also be described herein.

In the embodiment depicted in FIG. 3, the cover portion is provided with a handhole (or manhole) for interior inspection besides an opening 15 which is adapted not only to introduce the liquid to be treated but also to discharge the volatile component to be evaporated. The handhole (or manhole) is optional. The shape of the opening 15 is preferably cylindrical and its inner diameter may be determined as desired. It is however necessary to make the inner diameter of the opening 15 at least equal to the inner diameter of the evaporation residue discharge opening 8 of the first evaporator. It is preferred to make the inner diameter of the opening 15 greater than that of the evaporation residue discharge opening 8 so that deposition of the treated liquid on the inner wall of the cover portion can be successfully avoided.

At the bottom of the second evaporator, the evaporation residue discharge opening 19 is provided. The inner diameter of the opening 19 may also be determined as desired. In order to facilitate the discharge of the evaporation residue, the preferred inner diameter of the opening 19 is 10 cm or greater. Needless to say, the shape of the discharge opening 19 is not necessarily limited to the illustrated cylindrical nozzle. It may take the shape of a polygonal tubular nozzle.

The second evaporator is internally equipped with a scraping agitator supported by a rotary shaft 16 driven by a drive apparatus. In the embodiment depicted in FIG. 3, its scrapers 17 are fixedly attached by their respective arms 20 to the shaft 16 and are arranged in such a way that they scrape a deposit off from the downward-pointing conical wall section and the small-diameter cylindrical heating wall section provided underneath the conical wall section. Where the upper large-diameter cylindrical heating wall section is provided as shown in FIG. 3, the scrapers may optionally be extended upwards so that they can also scrape a deposit off from the large-diameter cylindrical heating wall section. Normally, the liquid has not been concentrated in the upper large-diameter cylindrical heating wall section to such an extent that a solid deposit may be formed there. In addition, the side wall of the large-diameter cylindrical heating wall section is usually bulged out to allow its side wall to lie outside the edge of the opening 15 as viewed in plan so that the side wall is kept free from the deposition of the liquid when the liquid drops into the second evaporator for its treatment. In many instances, it is thus unnecessary for the scrapers 17 to extend to the large-diametered cylindrical heating wall section. The preferable clearance between each of the scrapers 17 and each of the heating wall sections may generally range from 5 mm to 10 mm, although it may vary depending on the liquid to be treated. The dimensions and shapes of the scrapers, the shaft and the arms, which fix the scrapers on the shaft, may be determined as desired. Needless to say, they are required to have mechanical strengths sufficient to permit easy stirring and scraping of a liquid to be treated. By the way, the arms 20 serve not only to fix the scrapers 17 on the shaft 16 but also to stir and disperse the treated liquid.

In the embodiment illustrated in FIG. 3, the heating means, which is provided on the outer surface of the side wall portion, has been formed by spirally wrapping a pipe 18 for causing a heating medium such as steam to pass therethrough. The heating means may be a jacket or an electrical heating device. No particular limitations are imposed on the shape and type of the heating means so long as the heating means can satisfactorily supply the heat required for the evaporator. Although not illustrated in FIG. 3, it is also preferred to provide heating means on the upper surface of the cover portion so as to avoid condensation of the once-evaporated matter on the cover portion.

The evaporation residue discharge opening 8 of the first evaporator is connected to the opening 15 of the cover portion of the second evaporator in such a relative positional relation that the evaporation residue of the first evaporator is allowed to flow down into the second evaporator by its own gravity.

Figure 1:
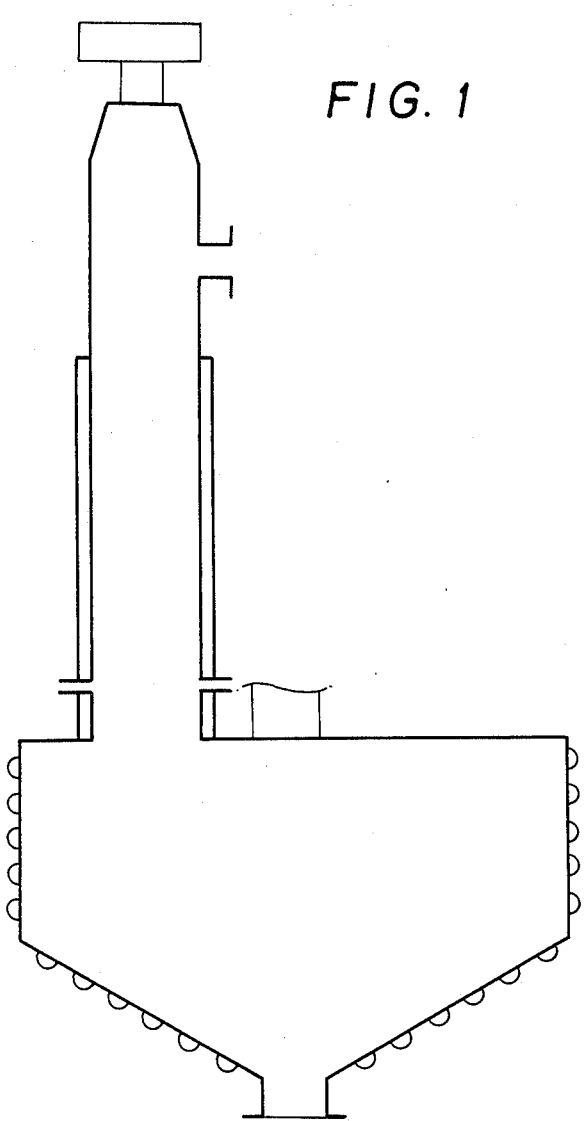
FIG. 1 is a simplified vertical and cross-sectional view illustrating, by way of example, the manner of connection between a first evaporator and a second evaporator in an evaporator according to this invention.

FIG. 1 is a simplified vertical cross-sectional view illustrating the manner of connection between the two evaporators. In the illustrated embodiment, the first evaporator of the upright configuration is disposed above the second evaporator and both evaporators are directly connected at their flanges.

The capacity of the second evaporator is designed and determined in accordance with the type of each liquid to be treated, the amount to be treated per unit time and the capacity of the first evaporator. The inner diameter of the upper extremity of the downward-pointing conical wall portion of the second evaporator or the height of the upper large-diametered cylindrical wall section if provided is determined depending on such parameters.

The operation and advantages of the present invention will hereinafter be described by applying the evaporator of this invention for the recovery of a volatile component from a high-viscosity liquid containing tar-like substances.

A high-viscosity liquid containing tar-like substances was fed through the opening 6 of the first evaporator. By the baffle 14 provided above the rotary vanes 2, the liquid was distributed toward the inner side wall of the first evaporator and was allowed to flow down on the rotary vanes 2. Owing to centrifugal forces applied to the liquid by the revolving rotary vanes 2, the liquid was spread against the inner side wall and was heated by the heating medium passing through the outer jacket 3. Accordingly, the volatile component in the liquid was caused to evaporate. The resultant vapor was allowed to flow upwardly through the spacings between the rotary vanes 2 and was then taken out of the system through the vapor outlet 7.

On the other hand, the liquid was caused to drop into the evaporation residue discharge opening 8 while being gradually concentrated and increased in viscosity, followed by its charging into the second evaporator through the opening 15 provided in the cover portion.

The thus-concentrated liquid was stirred by the scraping agitator while being heated by the heating medium passing through the externally-wrapped pipe 18. Owing to this stirring and heating, the volatile component which still remained in the tar-like matter was caused to evaporate further and the resultant vapor was allowed to flow upwardly through the opening 15 provided in the cover portion. Then, the vapor was combined with the vapor produced in the first evaporator, guided to the outside of the system through the vapor outlet 7, and recovered as the volatile component.

In the meantime, the tar-like matter was solidified in the second evaporator, ground by the scrapers 17, discharged through the evaporation residue discharge opening 19, and then either utilized or discarded.

The evaporator of this invention can omit such cost- and time-consuming operations that a volatile component is obtained from a high-viscosity liquid containing tar-like substances in a centrifugal falling-film evaporator and after storing the thus-concentrated tar-like substance temporarily in a storage tank or reservoir, the volatile component still remaining in the tar-like matter is recovered by a separate distillation apparatus. Moreover, the recovery rate of the volatile component from the liquid has been improved and the evaporation residue is obtained as a powderized solid. The post treatment of the evaporation residue has been facilitated.

As has been described above, the evaporator of this invention is extremely valuable from the industrial viewpoint for the recovery of a volatile component from a high-viscosity liquid containing tar-like substances. The evaporator of this invention has brought about a significant improvement to the recovery rate of each volatile component and it enjoys extremely-good operability.

The present invention will hereinafter be described further by the following Example.

EXAMPLE

By reacting 528 parts of hexamethylenediamine with 5220 parts of phosgene, 711 parts of hexamethylene diisocyanate (hereinafter called "HDI") and 46.9 parts of tar as a byproduct were obtained.

The reaction products were then subjected to rough distillation in a distillation tower. The bottom was a high-viscosity liquid which contained 115.7 parts of HDI and 46.9 parts of tar. The bottom was fed at a rate of about 240 kg/hr. to an evaporator of this invention.

The evaporator employed in the present Example had been constructed by connection, as shown in FIG. 1, a first evaporator of such an upright structure as that shown in FIG. 2 with a second evaporator of such a structure as that depicted in FIG. 3. The specifications of the first and second evaporators were as follows:

| First evaporator: | |
|---|---|
| Inner diameter | 290 mm |
| Outer diameter | 400 mm |
| (under a 30 mm thick jacket) | |
| Height | 2759 mm |
| Shaft diameter of agitator | 70 mm |
| Vane width of agitator | 286 mm |
| Second evaporator: | |
| Internal volume. | about 3.5 m$^3$ |
| Inner diameter of the upper large-diameter straight cylindrical section | 2000 mm |
| Diameter of lower discharge opening | 500 mm |
| Height: | |
| Upper large-diameter straight cylindrical section | 336 mm |
| Upper cover portion | 400 mm |
| Conical section | 1300 mm |
| Scraper: | |
| Shaft diameter | 100 mm |
| Shaft length | 1912 mm |
| Scraper shape | planar |
| Width | 120 mm |
| Thickness | 12 mm |
| Length | 1320 mm |

The interior of the first evaporator, namely, the upright falling-film evaporator was heated at 200° C. under reduced pressure (5 mmHg abs.) and the rotary vanes were driven at 620 rpm. The HDI component in the bottom was caused to evaporate in the first evaporator, and the evaporation residue having an increased viscosity was then allowed to flow downwardly into the second evaporator the agitator of which was driven at 20 rpm. In the second evaporator, the evaporation residue was heated again to about 210° C. under reduced pressure (5 mmHg abs.) so that the remaining HDI component was also caused to evaporate. The tar-like matter was converted first into a thick liquid and finally into a powderized solid, which was discharged through the evaporation residue discharge opening.

By the above evaporating operation, 104.1 parts of HDI were recovered. Its recovery rate was 90%.

On the other hand, the same distillation tower bottom was treated by using only the first evaporator, namely, the upright falling-film evaporator employed in the evaporator of this invention and operating it under the same operation conditions while feeding the bottom at the same feeding rate. This operation resulted in the recovery of HDI in an amount as little as 57.85 parts. The recovery rate was 50% only.

In this Comparative Example, the viscosity of the evaporation residue of the evaporator was so high that its feeding at a constant feeding rate became difficult. Therefore, the evaporation residue was treated batchwise in the second evaporator used in the evaporator of this invention with a view toward making further recovery of HDI. This attempt however resulted in the recovery of HDI in a small amount only. It was impossible to obtain the evaporation residue in a powdery form.

We claim:

1. An evaporator apparatus, comprising:
a first, centrifugal, falling-film evaporator comprising a cylindrical housing having a vertical axis, a first shaft coaxially disposed in said housing and a plurality of vanes connected to said first shaft for stirring liquid to be evaporated and spreading said liquid in a thin film on the inner surface of said housing, and a first discharge opening at the lower end of said housing for discharging evaporation residue from said first falling-film evaporator;
a second evaporator located directly below said first falling-film evaporator and comprising a vessel having a vertical axis and a sidewall portion comprised of an inverted frusto-conical section, a top wall covering the upper end of said vessel and a second discharge opening extending from the bottom end of said vessel for discharging evaporation residue from said second evaporator, a second shaft disposed inside said vessel, a plurality of scrapers mounted on said second shaft for rotation therewith for scraping off material deposited on the inner surface of said inverted frusto-conical section, said plurality of scrapers are disposed only in said inverted frusto-conical section, external heating means on the outer surface of said inverted frusto-conical section for evaporating volatile components of a material in said second evaporator, said housing of said first falling-film evaporator is positioned at one lateral side of said second shaft and said first shaft is laterally offset from said second shaft, a feed opening on said top wall directly connected to said first discharge opening of said first falling-film evaporator so that the evaporation residue discharged through said first discharge opening of said first falling-film evaporator flows by gravity through said feed opening, said feed opening also permitting an upward flow therethrough of volatilized components from said second evaporator into said first falling-film evaporator, said feed opening being of smaller diameter than said vessel and located to one lateral side of said vertical axis of said vessel and is radially inwardly spaced from the vessel wall so that the evaporation residue drops vertically onto the inner surface on said inverted frusto-conical section of said second evaporator.

2. An evaporator apparatus as claimed in claim 1 in which said side wall portion of said vessel further comprises a lower cylindrical wall section extending downwardly from the bottom end of said frusto-conical section.

3. An evaporator apparatus as claimed in claim 2 wherein said frusto-conical portion of said side wall is disposed at an angle in the range of from 25°–35° with respect to the vertical, said lower cylindrical wall section having a diameter in the range of 30–60 cm and is at least 10 cm in length.

4. An evaporator apparatus as claimed in claim 1 wherein said sidewall portion further comprises an upper cylindrical wall section extending upwardly from said frusto-conical wall section and at least a section of said upper cylindrical wall portion is heated by said external heating means.

* * * * *

UNITED STATES PATENT AND TRADEMARK OFFICE
CERTIFICATE OF CORRECTION

PATENT NO. : 4,812,203

DATED : March 14, 1989

INVENTOR(S) : Kenji OBATA et al

It is certified that error appears in the above-identified patent and that said Letters Patent is hereby corrected as shown below:

```
Column 10, line 6; change "section" (second occurrence)
                   to ---portion---.
            line 7; change "portion" to ---section---.
```

Signed and Sealed this

Sixteenth Day of February, 1993

*Attest:*

STEPHEN G. KUNIN

*Attesting Officer*    *Acting Commissioner of Patents and Trademarks*